(12) United States Patent
Sandberg

(10) Patent No.: US 9,710,554 B2
(45) Date of Patent: Jul. 18, 2017

(54) METHODS, APPARATUSES AND COMPUTER PROGRAM PRODUCTS FOR GROUPING CONTENT IN AUGMENTED REALITY

(75) Inventor: Jesper Sandberg, Valby (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 895 days.

(21) Appl. No.: 12/888,926

(22) Filed: Sep. 23, 2010

(65) Prior Publication Data

US 2012/0075341 A1    Mar. 29, 2012

(51) Int. Cl.
| | |
|---|---|
| G09G 5/00 | (2006.01) |
| G06F 17/30 | (2006.01) |
| G06F 3/147 | (2006.01) |
| G06F 3/01 | (2006.01) |
| G06T 19/00 | (2011.01) |
| G02B 27/01 | (2006.01) |

(52) U.S. Cl.
CPC ........ *G06F 17/30855* (2013.01); *G06F 3/147* (2013.01); *G02B 27/017* (2013.01); *G06F 3/011* (2013.01); *G06F 3/012* (2013.01); *G06T 19/00* (2013.01); *G06T 19/006* (2013.01)

(58) Field of Classification Search
CPC ....... G06T 19/006; G06T 19/00; G06F 3/011; G06F 3/012; G02B 27/017
USPC ..... 345/428, 157, 634, 631; 348/207.1, 169, 348/46, 51, 135, 222.1, 115; 382/103, 382/154
See application file for complete search history.

(56) References Cited

U.S. PATENT DOCUMENTS

| | | | |
|---|---|---|---|
| 5,553,209 A * | 9/1996 | Johnson et al. | ............... 345/667 |
| 6,271,845 B1 * | 8/2001 | Richardson | ................... 715/764 |
| 6,389,153 B1 | 5/2002 | Imai et al. | |

(Continued)

FOREIGN PATENT DOCUMENTS

| | | |
|---|---|---|
| CN | 101379369 A | 3/2009 |
| EP | 0 583 060 A2 | 2/1994 |

(Continued)

OTHER PUBLICATIONS

International Search Report dated Nov. 22, 2011 for Application No. PCT/FI2011/050692.

(Continued)

*Primary Examiner* — Abderrahim Merouan
(74) *Attorney, Agent, or Firm* — Alston & Bird LLP

(57) ABSTRACT

An apparatus for grouping content in an augmented reality environment may include a processor and memory storing executable computer code that cause the apparatus to at least perform operations including receiving a detection of real world objects, of a current location, that are currently displayed. The computer program code may further cause the apparatus to determine whether one or more of the real world objects are located along a line of direction and determine virtual objects that correspond to the real world objects located along the line. The computer program code may further cause the apparatus to display an item of visible indicia signifying a group, associated with the virtual objects, that is positioned so as to correspond to at least one of the real world objects located along the line. Corresponding methods and computer program products are also provided.

25 Claims, 11 Drawing Sheets

(56) References Cited

U.S. PATENT DOCUMENTS

| | | | |
|---|---|---|---|
| 6,995,778 B2* | 2/2006 | Noble et al. | 345/632 |
| 7,076,741 B2 | 7/2006 | Miyaki | |
| 7,668,649 B2* | 2/2010 | Onishi | 701/426 |
| 7,889,888 B2* | 2/2011 | Deardorff et al. | 382/113 |
| 8,103,126 B2 | 1/2012 | Hayashi | |
| 8,264,584 B2 | 9/2012 | Mukai et al. | |
| 8,339,399 B2* | 12/2012 | Snow | 345/440 |
| 2002/0130906 A1* | 9/2002 | Miyaki | 345/837 |
| 2004/0098195 A1 | 5/2004 | Listle et al. | |
| 2004/0243306 A1* | 12/2004 | Han | 701/211 |
| 2005/0182561 A1* | 8/2005 | Yamada et al. | 701/209 |
| 2007/0162942 A1* | 7/2007 | Hamynen et al. | 725/105 |
| 2009/0003657 A1* | 1/2009 | Deardorff et al. | 382/113 |
| 2009/0006328 A1* | 1/2009 | Lindberg et al. | 707/3 |
| 2009/0055774 A1* | 2/2009 | Joachim | 715/810 |
| 2009/0100363 A1* | 4/2009 | Pegg et al. | 715/765 |
| 2009/0110302 A1* | 4/2009 | Snow | 382/225 |
| 2009/0177987 A1* | 7/2009 | Jayakody | 715/764 |
| 2010/0023259 A1* | 1/2010 | Krumm et al. | 701/208 |
| 2010/0318573 A1* | 12/2010 | Yoshikoshi | 707/802 |
| 2011/0047509 A1* | 2/2011 | Arrasvuori | 715/815 |
| 2011/0265023 A1* | 10/2011 | Loomis et al. | 715/771 |

FOREIGN PATENT DOCUMENTS

| | | |
|---|---|---|
| EP | 1 521 216 A1 | 4/2005 |
| JP | H 6-502734 A | 3/1994 |
| JP | H 7-271546 A | 10/1995 |
| JP | H 8-503326 A | 4/1996 |
| JP | 2002-340588 A | 11/2002 |
| JP | 2003-216977 A | 7/2003 |
| JP | 2006-227744 A | 8/2006 |
| JP | 2009-017540 A | 1/2009 |
| JP | 2009-271732 A | 11/2009 |
| JP | 2010-0238098 | 10/2010 |
| WO | WO 92/08199 A1 | 5/1992 |
| WO | WO 99/23611 | 5/1999 |
| WO | WO 99/26198 | 5/1999 |
| WO | WO 2011/080385 | 7/2011 |
| WO | WO 2012/038585 A1 | 3/2012 |

OTHER PUBLICATIONS

Written Opinion of International Searching Authority dated Nov. 22, 2011 for Application No. PCT/FI2011/050692.

Machine Generated English Translation of Abstract and Biographical Data for Japanese Patent No. JP 2010-0238098.

Machine Generated English Translation of Japanese Patent No. JP 2010-0238098.

Novotny, "Visually Effective Information Visualization of Large Data," http://www.cg.tuwien.ac.at/hostings/cescg/CESCG-2004/papers/21_NovotnyMatej.pdf, Eighth Central European Seminar on Computer Graphics (CESCG 2004, Apr. 19-21, 2004).

Einsfeld et al., "Modified Virtual Reality for Intuitive Semantic Information Visualization;" http://www.einsfeld.de/beruf/IV08.pdf, Information Visualisation, 2008. IV '08. 12th International Conference, pp. 515-520, Jul. 9-11, 2008.

Japan Patent Office, Office Action for Application No. 2013-529686, 8 pages, Japan.

European Patent Office, Extended European Search Report for Application No. 11826452.2, Aug. 11, 2014, 6 pages, Germany.

State Intellectual Property Office of the P.R.C., Second Office Action for Application No. 201180056310.X, Apr. 6, 2016, 6 pages, China.

Intellectual Property Corporation of Malaysia, Substantive Examination Adverse Report for Application No. PI 2013000952, Aug. 30, 2016, 3 pages, Malaysia.

State Intellectual Property Office of the P.R.C., First Office Action for Application No. 201180056310.X, Aug. 5, 2015, 7 pages, China.

State Intellectual Property Office of the P.R.C., Second Office Action for Application No. 201180056310.X, Oct. 9, 2016, 6 pages, China.

State Intellectual Property Office of the P.R.C., Third Office Action for Application No. 201180056310.X, Apr. 5, 2017, 7 pages, China.

* cited by examiner

METHODS, APPARATUSES AND COMPUTER PROGRAM PRODUCTS FOR GROUPING CONTENT IN AUGMENTED REALITY

TECHNOLOGICAL FIELD

An embodiment of the invention relates generally to user interface technology and, more particularly, relates to a method, apparatus, and computer program product for grouping content in an augmented reality environment.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, etc. The services may also be in the form of interactive applications in which the user may respond to a network device in order to perform a task or achieve a goal.

In some situations, mobile terminals may enhance the interaction that users have with their environment. Numerous use cases have developed around the concept of utilizing mobile terminals to enhance user interaction with their local area such as, for example, virtual tour guides and other mixed reality applications. Mixed reality involves the merging of real and virtual worlds. In some cases, mixed reality involves mixing real world image data with virtual objects in order to produce environments and visualizations in which physical and digital objects co-exist and potentially also interact in real time. Mixed reality includes augmented reality, which uses digital imagery to augment or add to real world imagery, and virtual reality, which simulates real world environments using computer simulation.

Augmented reality (AR) is a fast growing area, which is currently available on many mobile platforms (e.g., Symbian™, Android™, iPhone™, Windows Mobile™, etc.). The concept of augmented reality is to overlay graphics or information on a live video stream or a still image from a camera in a communication device. The graphics/information may be of any kind. In augmented reality graphics/information about the environment and objects in it may be stored and retrieved as an information layer on top of a view of the real world.

A common use of augmented reality is to overlay points of interests (POIs) on a video stream or still image. These POIs may be associated with static information, like landmarks, for example or any information that may be geocoded (e.g., contains a coordinate(s)). An example of the use of augmented reality may be seen in FIG. 1, where information provided by an augmented reality application may be overlaid on a camera view of a communication device. The information provided by the augmented reality application may correspond to icons 2, 4, 6, 8, 12, 14, 15, 16 depicting points of interest associated with local places (e.g., museums, stadiums, etc.) in the real world that may be captured by a camera of the communication device.

When a consumer presses one of the icons for example, the user may be presented with more information about an article associated with the selected icon. As an example, augmented reality may be used by consumers when they are in new places, and want to obtain information about things they see. By standing in front of a tourist attraction and pointing a camera at the attraction, the consumer may obtain information about the attraction.

A common issue associated with current augmented reality applications is that the information that the AR applications may provide may be arranged behind each other in the same direction with different distances to the information. As such, it may be difficult to present this information to a display of a communication device. For instance, the icons associated with the information closest to the communication device may block the view to information further away from the communication device. In this regard, some of the information provided by an augmented reality application may not be visible, as it may be hidden behind other information, which may be closer to communication device.

As an example, consider FIG. 2 in which four points of interest 3, 5, 7, 9 are approximately arranged along a line 1. If a user of a communication device was situated at either end of the line 1, and pointed a camera of the communication device in the direction of the line 1, some of the points of interest captured by the camera may be blocked and hidden on the display of the communication device. For instance, the user may be able to view the point of interest (e.g., point of interest 3) closest to the communication device but may be unable to view and access the points of interest (e.g., points of interest 5, 7, 9) that are further away along the line 1 since these points of interest may be arranged behind the closest point of interest (e.g., point of interest 3).

As shown in FIG. 3, currently when a user utilizes a communication device to capture points of interest arranged substantially along a line (e.g., line 1) a point of interest 3 closest to the communication device may be provided by an AR application to a display of the communication device. On the other hand, the points of interest (e.g., points of interest 5, 7, 9) substantially along a line 1 that are further away from the communication device may be hidden or blocked on a display. As such, the user many be unaware that additional points of interest are available for selection.

Typically, the display of points of interest in the same direction that are substantially along a line in augmented reality is achieved by allowing a user of a communication device to select a fixed range or distance in which the user wanted to see information. For example, the user may utilize the communication device to select a fixed range/distance by instructing the communication device that the user wants to see all information within 2 kilometers. However, this existing approach suffers from drawbacks in that it does not actually solve the core problem. For instance, by utilizing this approach, the user may remove some points of interest behind the closest point on interest. As such, the communication device may not enable viewing and access to information that may be of interest to the user. In this regard, the user may be unable to see the points of interest that are further away.

In view of the foregoing drawbacks, it may be desirable to provide an efficient and reliable mechanism that enables points of interest situated substantially along a straight line to be displayed and accessible via a communication device in an augmented reality environment.

SUMMARY

A method, apparatus and computer program product are therefore provided for grouping items of content for display in an augmented reality environment. An example embodiment may eliminate the issue related to showing places or objects which are located in the same view angle on a line (e.g., straight line) starting from a location of a device. This may be achieved by including all points of interest corresponding to the places and objects in a group(s). The group(s) of points of interest may be denoted by visible indicia that may be shown on a display. The visible indicia may, but need not, correspond to a graphical representation of a folder, tab, menu or the like. The points of interest of the group(s) may be shown and accessible via a display in a way that is easily recognizable even though the corresponding places and objects may be substantially or approximately located along the same line of direction. Selecting the visible indicia depicting the group may open (e.g., un-folding a graphical representation of a folder) the group and enable the points of interest inside the group to be available for viewing and accessible by a user of a communication device.

In an example embodiment, when the group is open, a user of the communication device may access the points of interest inside the group. It should be pointed out that the group may be closed again by selecting the visible indicia denoting the group at a time subsequent to an initial selection of the visible indicia.

One advantage of an example embodiment is that it may provide a better experience for a user of a communication device when utilizing augmented reality. In this regard, the example embodiment may present more points of interest to the user, since the points of interest may not block or hide each other and may be shown in an intuitive manner via a display of a communication device.

In one example embodiment, a method for grouping content in an augmented reality environment is provided. The method may include receiving a detection of real world objects that are currently being displayed and determining whether one or more of the real world objects are located along a line of direction. The real world objects relate to a current location. The method may further include determining virtual objects that correspond to the real world objects that are located along the line and enabling display of an item of visible indicia signifying a group that is positioned so as to correspond to at least one of the real world objects located along the line. The group is associated with the virtual objects.

In another example embodiment, an apparatus for grouping content in an augmented reality environment is provided. The apparatus may include a processor and a memory including computer program code. The memory and the computer program code are configured to, with the processor, cause the apparatus to at least perform operations including receiving a detection of real world objects that are currently being displayed and determining whether one or more of the real world objects are located along a line of direction. The real world objects relate to a current location. The memory and the computer program code may further cause the apparatus to determine virtual objects that correspond to the real world objects that are located along the line and enable display of an item of visible indicia signifying a group that is positioned so as to correspond to at least one of the real world objects located along the line. The group is associated with the virtual objects.

In another example embodiment, a computer program product for grouping content in an augmented reality environment is provided. The computer program product includes at least one computer-readable storage medium having computer executable program code instructions stored therein. The computer executable program code instructions may include program code instructions configured to cause receipt of a detection of real world objects that are currently being displayed and determine whether one or more of the real world objects are located along a line of direction. The real world objects relate to a current location. The program code instructions may also be configured to determine virtual objects that correspond to the real world objects that are located along the line and enable display of an item of visible indicia signifying a group that is positioned so as to correspond to at least one of the real world objects located along the line. The group is associated with the virtual objects.

In another example embodiment, an apparatus for grouping content in an augmented reality environment is provided. The apparatus may include means for receiving a detection of real world objects that are currently being displayed and means for determining whether one or more of the real world objects are located along a line of direction. The real world objects relate to a current location. The apparatus may also include means for determining virtual objects that correspond to the real world objects that are located along the line and means for enabling display of an item of visible indicia signifying a group that is positioned so as to correspond to at least one of the real world objects located along the line. The group is associated with the virtual objects.

An embodiment of the invention may provide a better user experience since the user may be able to view and access virtual information that may be arranged substantially along a straight line, instead of spending time selecting a fixed range or distance that may reduce the number of points of interest that may be available for viewing and accessing. As a result, device users may enjoy improved capabilities with respect to applications and services accessible via the device.

BRIEF DESCRIPTION OF THE SEVERAL VIEWS OF THE DRAWINGS

Figure 1:
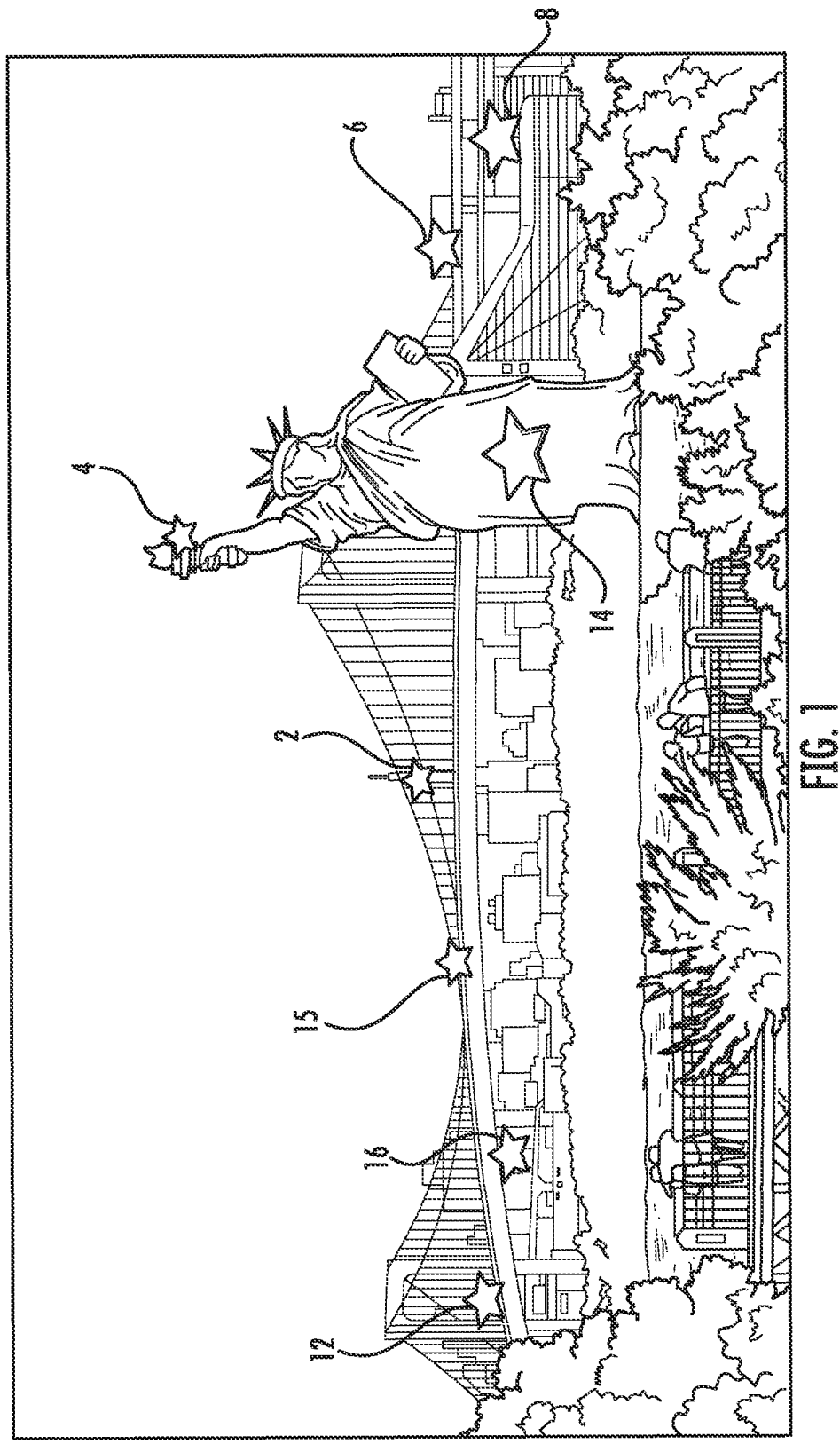
Figure 2:
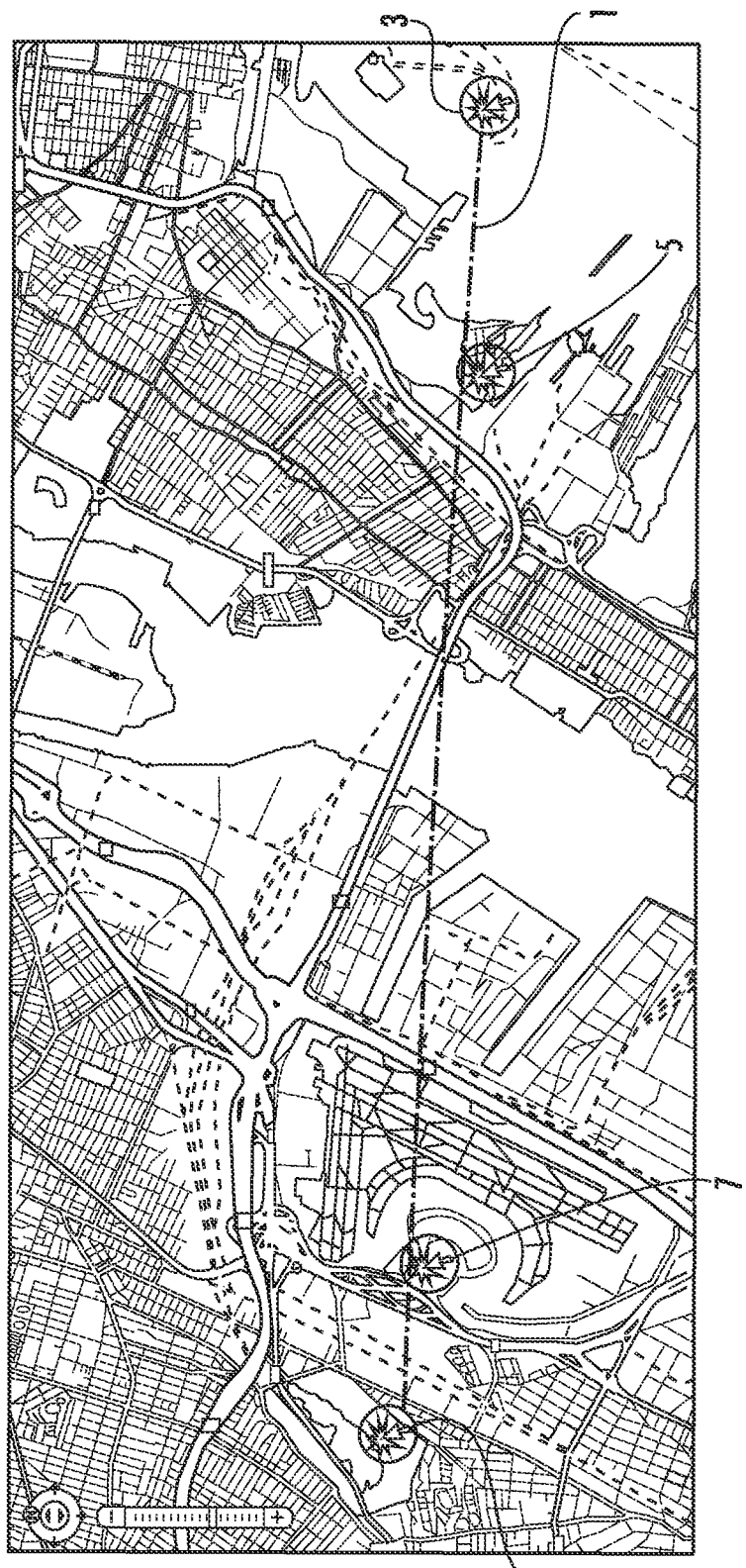
Figure 3:
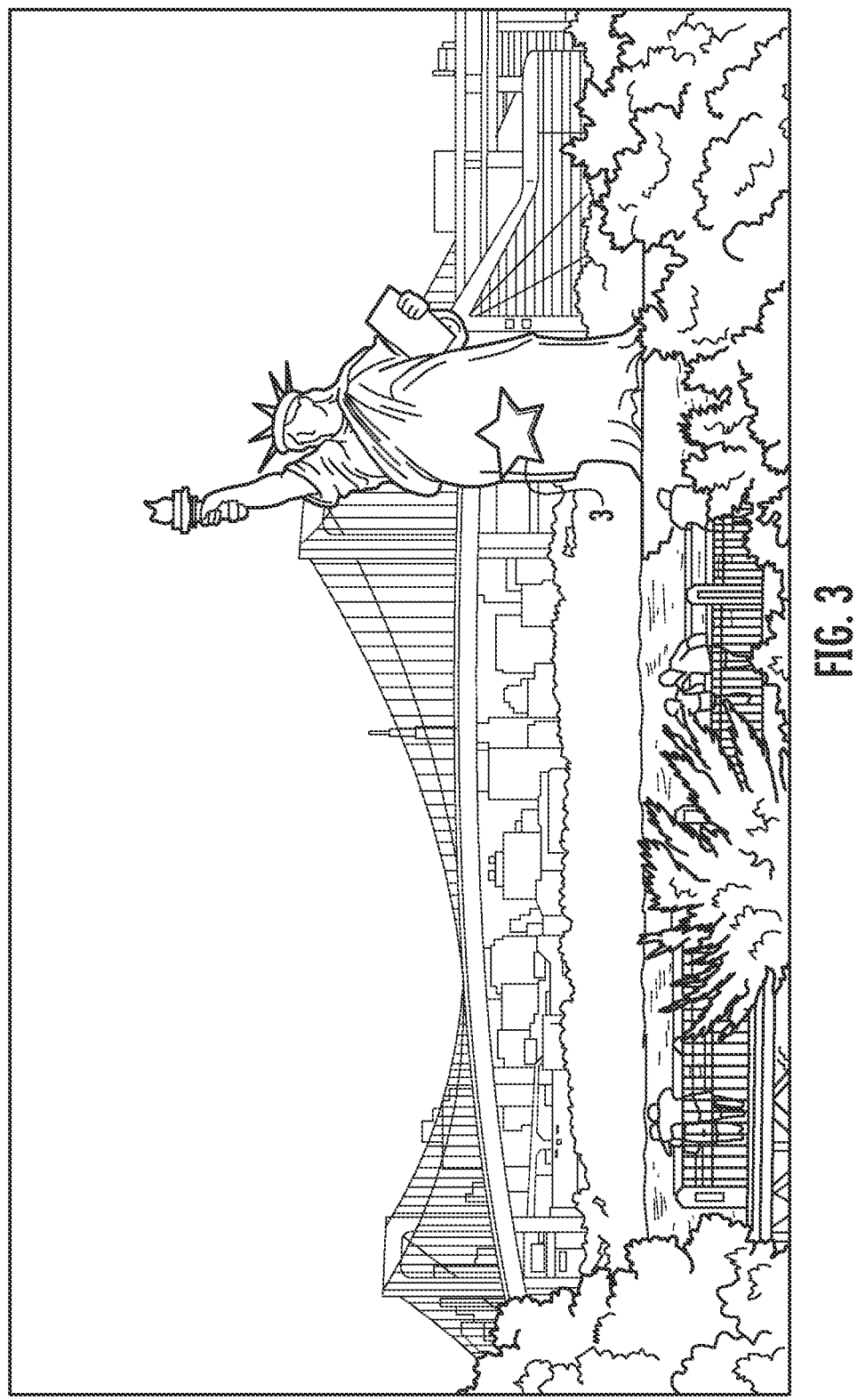
Figure 4:
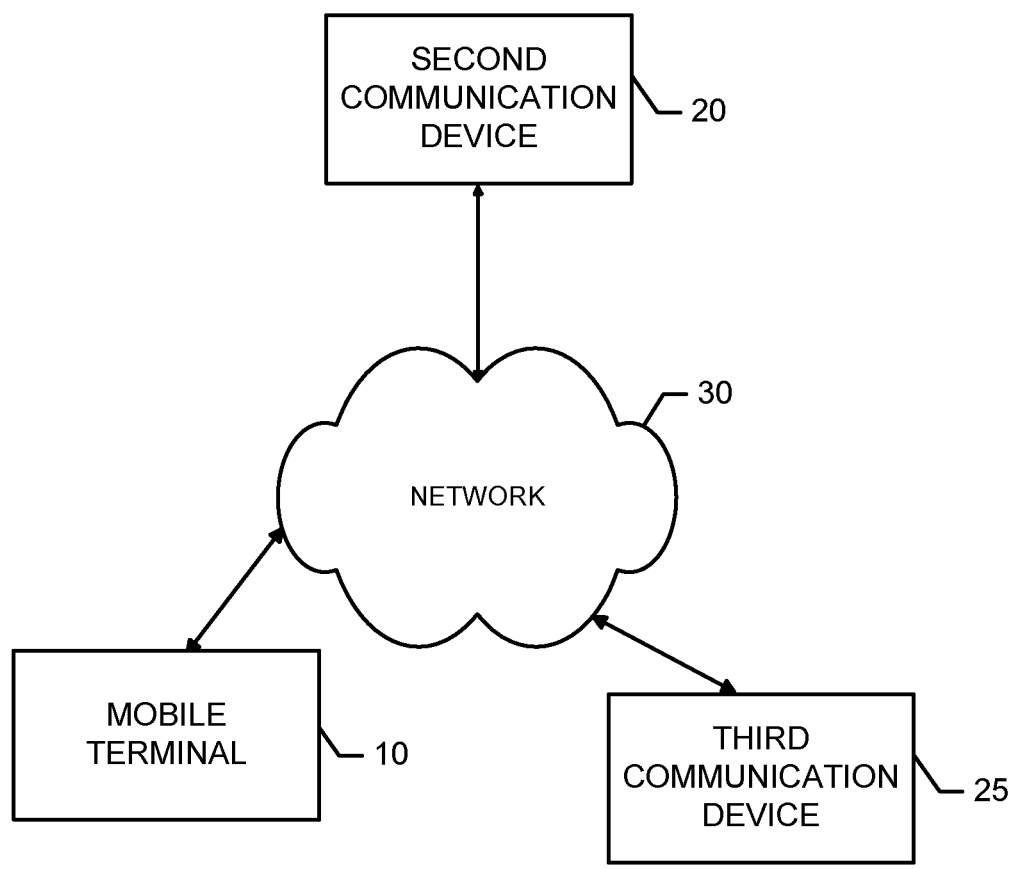
Figure 5:
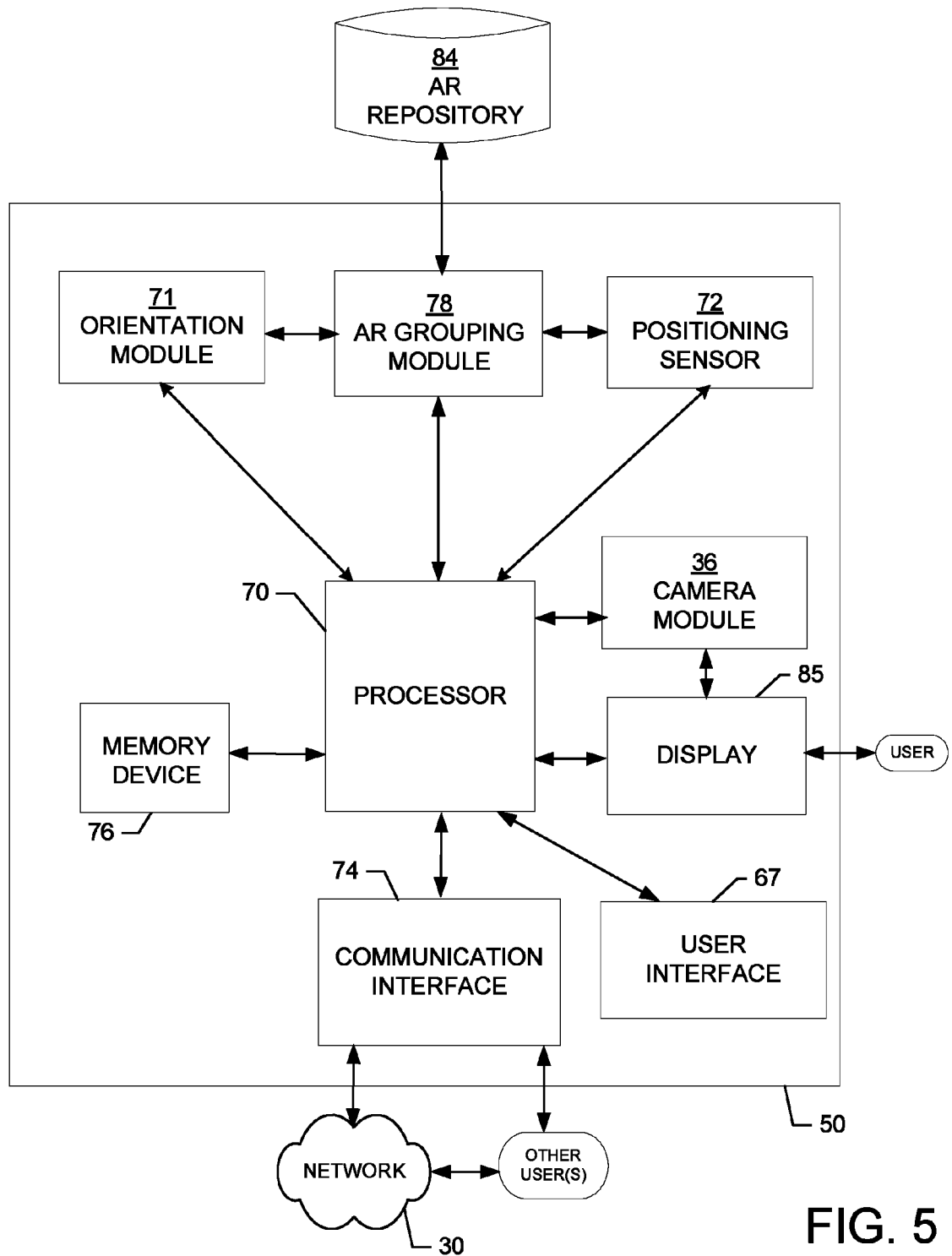
Figure 6:
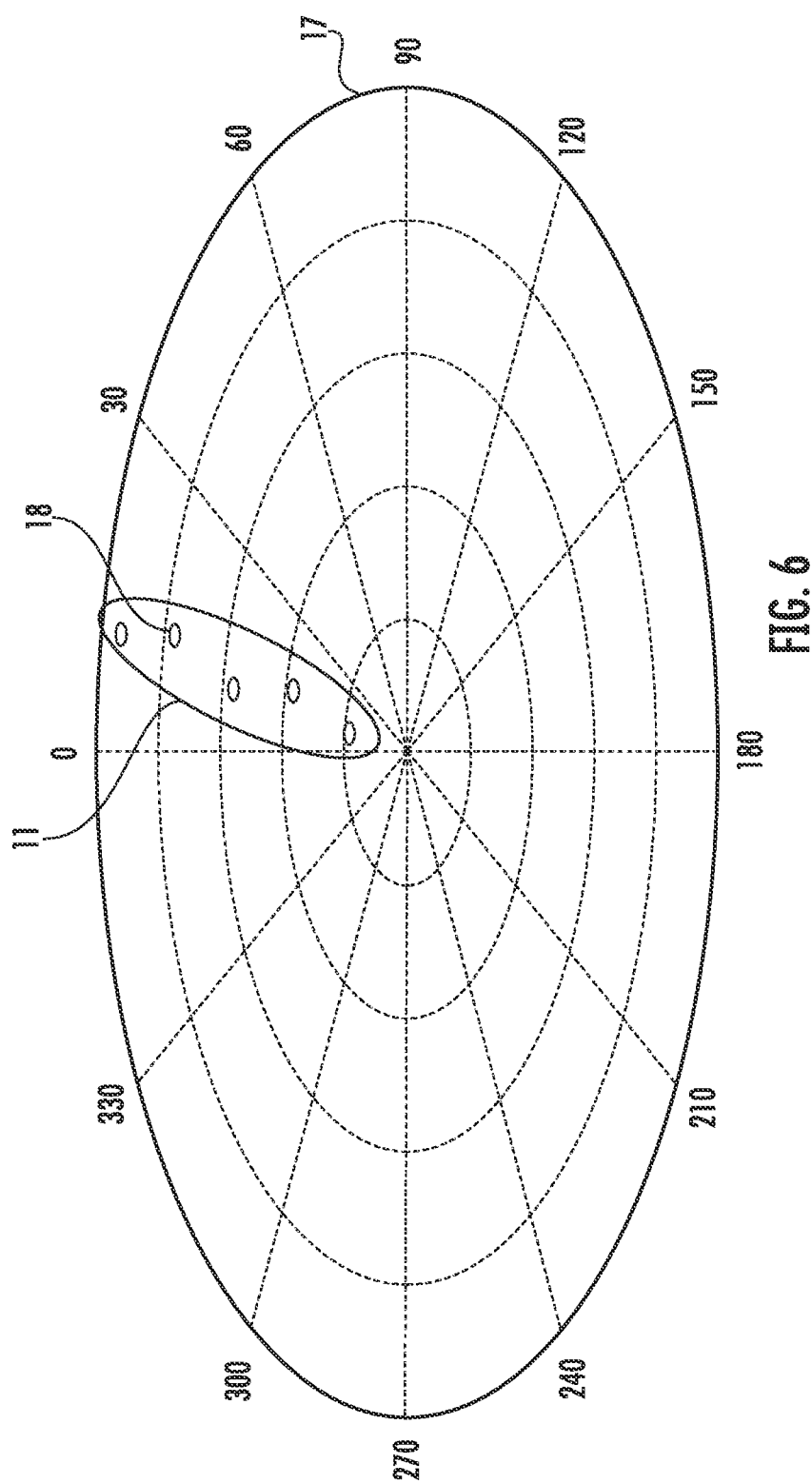
Figure 7:
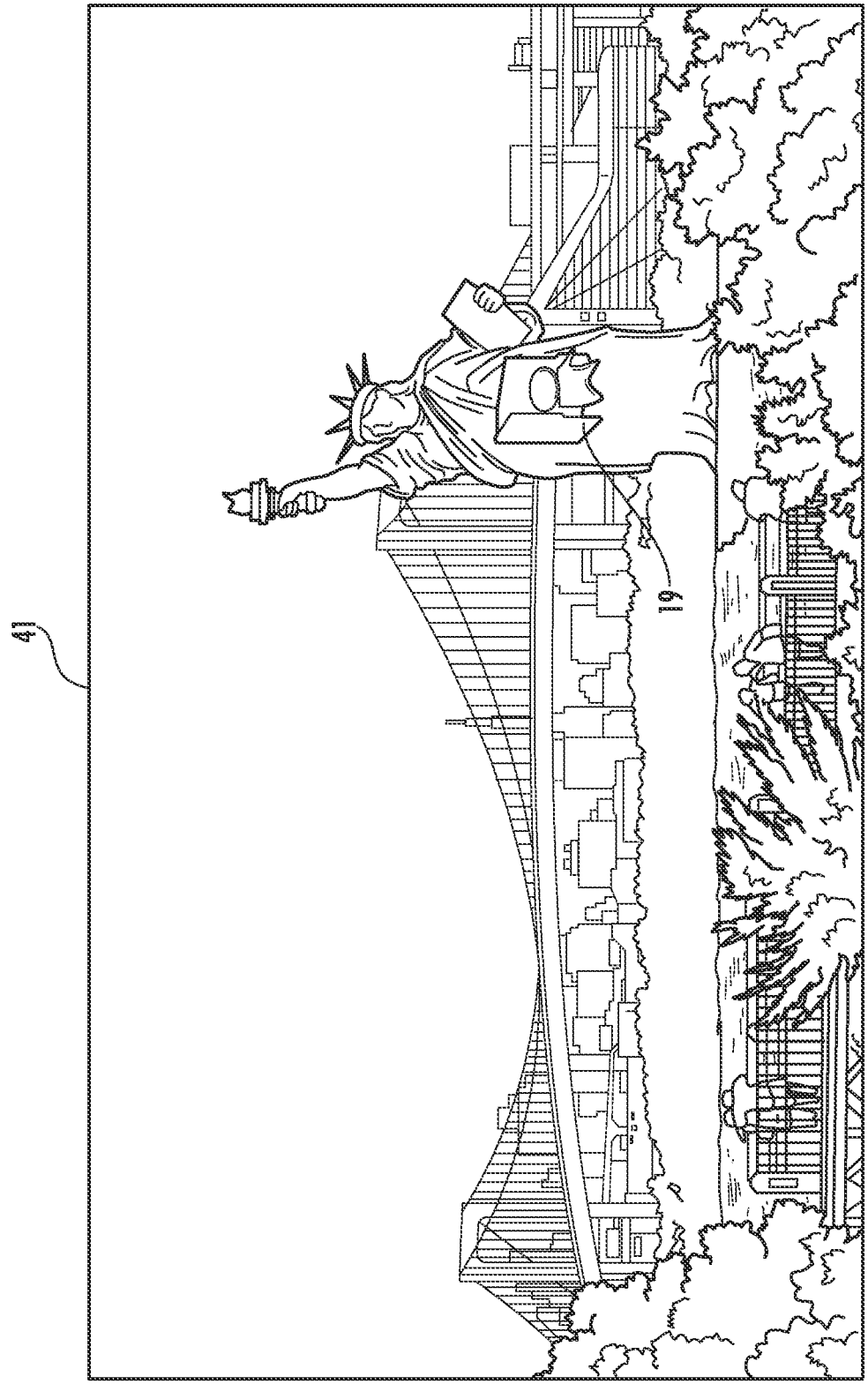
Figure 8:
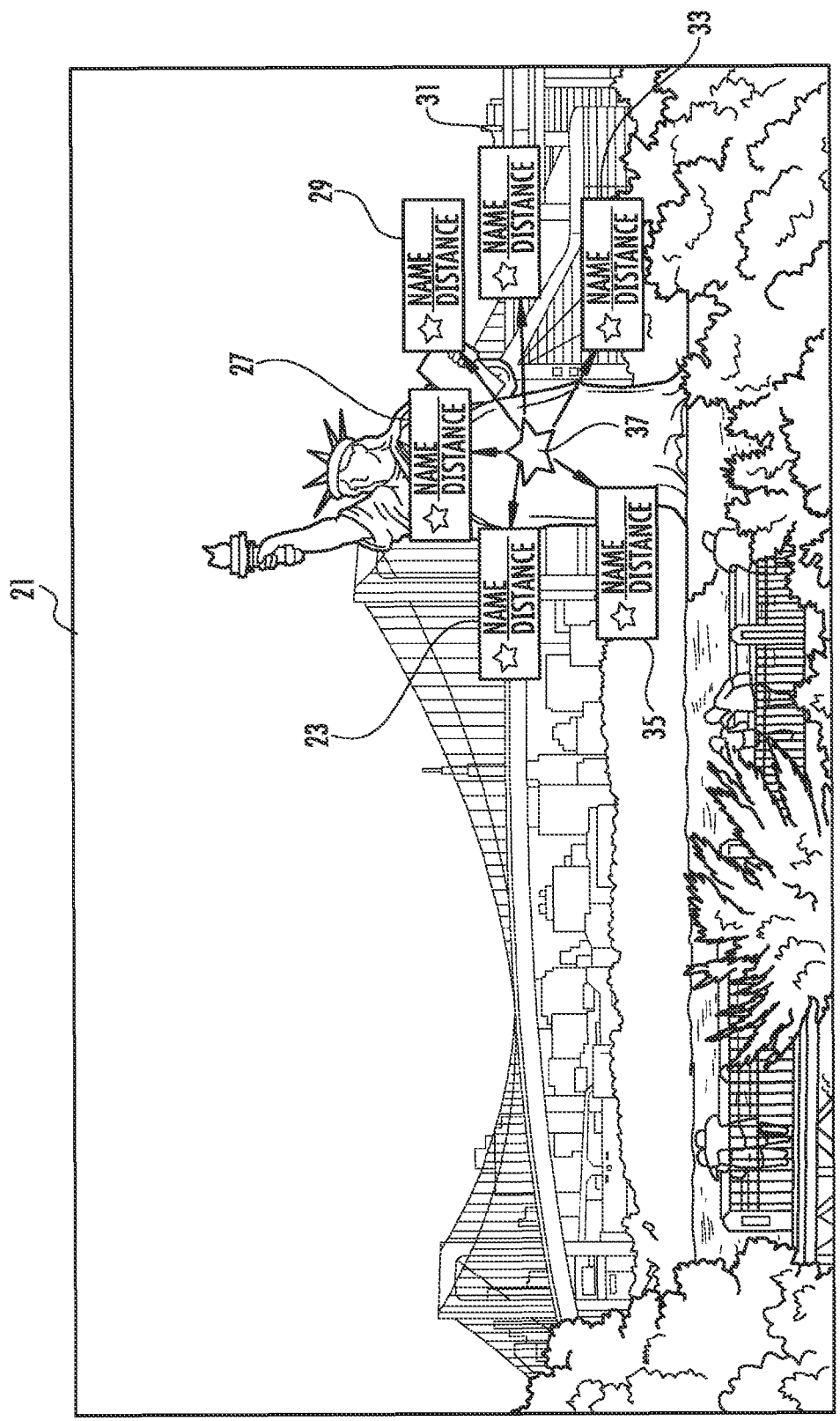
Figure 9:
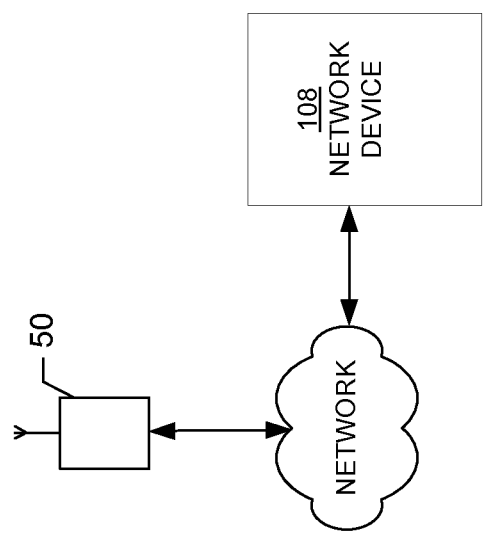
Figure 10:
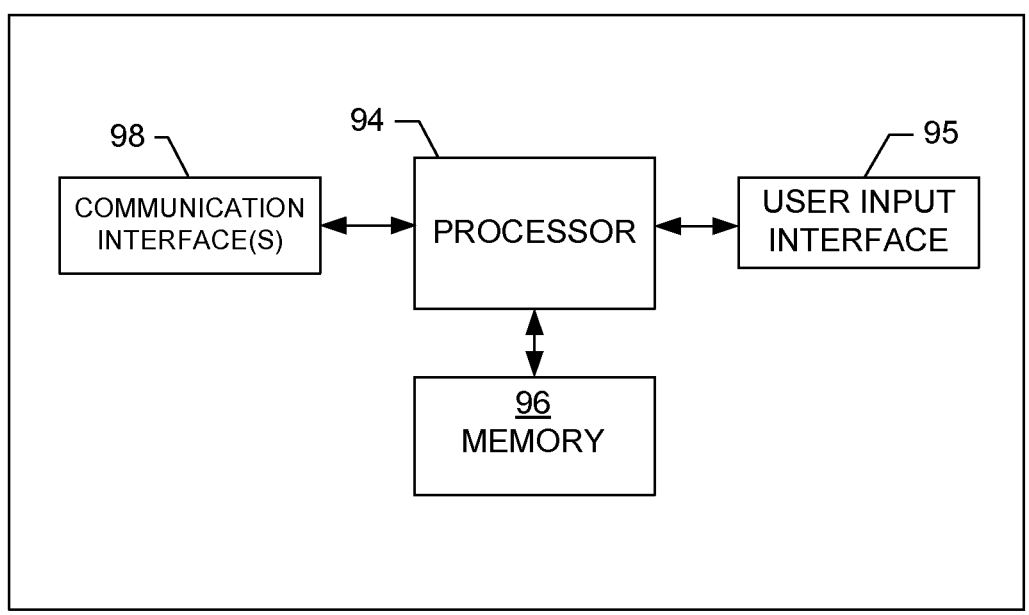
Figure 11:
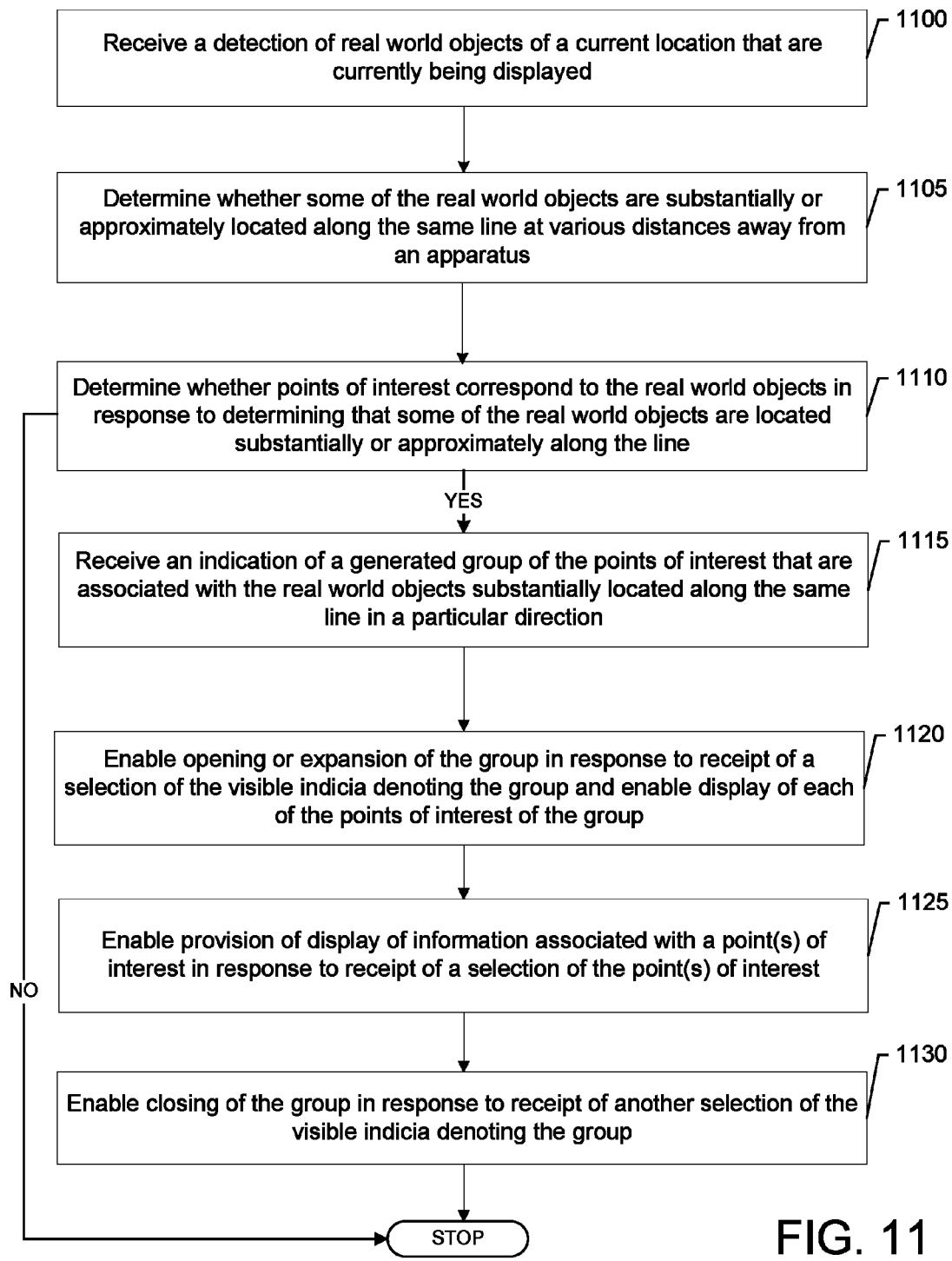

Having thus described embodiments of the invention in general terms, reference will now be made to the accompanying drawings, which are not necessarily drawn to scale, and wherein:

FIG. 1 is an illustration of a view of virtual information provided by an augmented reality application for a current location;

FIG. 2 is an illustration of a view of points of interest situated approximately on a line;

FIG. 3 is an illustration of a view of points of interest along a line provided by an augmented reality application;

FIG. 4 is a schematic block diagram of a system according to an example embodiment of the invention;

FIG. 5 is a schematic block diagram of an apparatus for grouping items of content in an augmented reality environment according to an example embodiment of the invention;

FIG. 6 is a diagram illustrating a group of items of content that are placed approximately along a line in a direction according to an example embodiment of the invention;

FIG. 7 is a diagram illustrating a group of multiple points of interest in augmented reality according to an example embodiment of the invention;

FIG. 8 is a diagram illustrating the contents of a group in augmented reality according to an example embodiment of the invention;

FIG. 9 is a schematic block diagram of a system according to an example embodiment of the invention;

FIG. 10 is a schematic block diagram of a network entity according to an example embodiment of the invention; and FIG. 11 illustrates a flowchart for grouping items of content in an augmented reality environment according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the invention. Moreover, the term "exemplary", as used herein, is not provided to convey any qualitative assessment, but instead merely to convey an illustration of an example. Thus, use of any such terms should not be taken to limit the spirit and scope of embodiments of the invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein "view distance" or "view range" may refer a distance in which a device (e.g., camera module 36) may be able to view information (e.g., virtual information) that may be shown on a display (e.g., a camera view of a display). For purposes of illustration and not of limitation, when the view distance is set to 400 meters, information (e.g., virtual information) located at a distance of 420 meters from an apparatus or device of a user may not be shown on the display. On the other hand, information located at a distance 390 meters from the apparatus or device may be shown on the display.

Additionally, as used herein, the term "camera view angle" or "camera view field" may refer to an angle for a camera that may be shown on a display. As referred to herein, the terms "point of interest(s)" (POI(s)), "item(s) of virtual information", "virtual object(s)" and similar terms may be used interchangeably to refer to a point(s) in space (e.g., a geo-coordinate(s) such as, for e.g., longitude, latitude, altitude coordinates) which contains or is associated with some information (e.g., text, audio data, media content such as, for example, an image(s), picture(s), video data, etc.). The point(s) of interest or item(s) of virtual information may be marked on a display by a graphical element(s) (e.g., an icon(s), pictogram(s), etc.). Additionally, the point (s) of interest may correspond to one or more real world objects captured by a media capturing device (e.g., camera module 36) in which the real world objects may be located substantially or approximately along a line. In one embodiment, real world objects captured by a device that are located in a particular direction within a particular threshold (e.g., ±5 degrees) of a line may be considered to be located along the line. As such, the points of interest associated with these real world objects may be considered to be arranged along a line in an instance in which the real world objects are within a predetermined threshold (e.g., ±5 degrees) of a line (e.g., a straight line).

In addition, as referred to herein "located along a line of direction" and similar terms means on the line or near or approximately on the line, such as within a threshold (e.g., measured in angles, linear distance, etc.) from the line.

FIG. 4 illustrates a generic system diagram in which a device such as a mobile terminal 10 is shown in an example communication environment. As shown in FIG. 4, an embodiment of a system in accordance with an example embodiment of the invention may include a first communication device (e.g., mobile terminal 10) and a second communication device 20 capable of communication with each other via a network 30. In some cases, an embodiment of the invention may further include one or more additional communication devices, one of which is depicted in FIG. 4 as a third communication device 25. However, not all systems that employ an embodiment of the invention may comprise all the devices illustrated and/or described herein. While an embodiment of the mobile terminal 10 and/or second and third communication devices 20 and 25 may be illustrated and hereinafter described for purposes of example, other types of terminals, such as personal digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the invention. Furthermore, devices that are not mobile, such as servers and personal computers may also readily employ an embodiment of the invention.

The network 30 may include a collection of various different nodes (of which the second and third communication devices 20 and 25 may be examples), devices or functions that may be in communication with each other via corresponding wired and/or wireless interfaces. As such, the illustration of FIG. 4 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE), LTE advanced (LTE-A) and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a Local Area Network (LAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other, for example, according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 4, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as, for example, personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities. In an example embodiment, one or more of the devices in communication with the network 30 may employ an AR grouping module (e.g., AR grouping module 78 of FIG. 5). The AR grouping module may enable detection of points of interest placed substantially along a line and include the detected points of interest in a group (also referred to herein as "view-group(s)") for accessing and viewing.

The AR grouping module may generate the view-groups in various manners including as a folder, tab, menu, button or the like. The AR grouping module may enable display of the view-group(s) via an apparatus. When a user of an apparatus selects the view-group via a display, the AR grouping module may enable the view-group to be opened. In this regard, in an instance in which the view-group(s) may be a folder or the like, the folder may be unfolded to serve as visible indicia that the view-group is open. In an instance in which the view-group is open, the user may select one or more displayed items of content (e.g., points of interest) included in the view-group. The items of content may be points of interest that are associated with one or more icons. When a view-group(s) is open the user may access the points of interest included in the view-group. In this regard, the AR grouping module may enable provision of display of information associated with an accessed point(s) of interest. The AR grouping module may close an opened view-group(s) in response to receipt of an indication that a user of an apparatus selected the view-group(s) at a time subsequent to an initial selection of the respective view-group(s). For instance, in an example embodiment in which the view-group(s) may be a folder or the like, an opened folder may be closed by the AR grouping module in response to receipt of a selection of the folder at a time subsequent to an initial selection of the folder (since the initial selection of the folder enabled the AR grouping module to open the folder).

In an example embodiment, the mobile terminal 10 and the second and third communication devices 20 and 25 may be configured to include the AR grouping module. However, in an alternative embodiment the mobile terminal 10 may include the AR grouping module and the second and third communication devices 20 and 25 may be network entities such as servers or the like that may be configured to communicate with each other and/or the mobile terminal 10. For instance, in an example embodiment, the second communication device 20 may be a dedicated server (or server bank) associated with a particular information source or service (e.g., a localized augmented/virtual reality service, a mapping service, a search service, a media provision service, etc.) or the second communication device 20 may be a backend server associated with one or more other functions or services. As such, the second communication device 20 may represent a potential host for a plurality of different services or information sources. In one embodiment, the functionality of the second communication device 20 may be provided by hardware and/or software components configured to operate in accordance with techniques for the provision of information to users of communication devices.

However, at least some of the functionality provided by the second communication device 20 may be information provided in accordance with an example embodiment of the invention.

In an example embodiment, the second communication device 20 may host an apparatus for providing a localized augmented/virtual reality service and/or may host an provision service that provides information (e.g., text, images, videos, audio data, etc.) to a device (e.g., mobile terminal 10) practicing an embodiment of the invention. The localized augmented/virtual reality service may provide items of virtual/augmented information about an environment displayed in a camera view of a device (e.g., mobile terminal 10) and the real world objects in the environment.

The third communication device 25 may also be a server providing a number of functions or associations with various information sources and services (e.g., a localized virtual/augmented reality service, a mapping service, a search service, a media provision service, etc.). In this regard, the third communication device 25 may host an apparatus for providing virtual/augmented reality information to the second communication device 20 to enable the second communication device to provide the virtual/augmented reality information to a device (e.g., the mobile terminal 10) practicing an embodiment of the invention. The virtual/augmented reality information provided by the third communication device 25 to the second communication device 20 may provide information about an environment displayed in a camera view of a device (e.g., mobile terminal 10) and the objects in the environment.

As such, in one embodiment, the mobile terminal 10 may itself perform an example embodiment. In another embodiment, the second and third communication devices 20 and 25 may facilitate (e.g., by the provision of augmented/virtual reality information) operation of an example embodiment at another device (e.g., the mobile terminal 10). In still another example embodiment, the second and third communication devices 20 and 25 may not be included at all.

FIG. 5 illustrates a schematic block diagram of an apparatus for grouping one or more items of content, in augmented reality, associated with points of interest located approximately along a line. An example embodiment of the invention will now be described with reference to FIG. 5, in which certain elements of an apparatus 50 are displayed. The apparatus 50 of FIG. 5 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 5, the apparatus 50 may include or otherwise be in communication with a processor 70, a user interface 67, a communication interface 74, a memory device 76, a display 85, an orientation module 71, an augmented reality (AR) grouping module 78, a positioning sensor 72, a camera module 36 and an AR repository 84. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.).

The memory device 76 may store geocoded information that may be associated with location information corresponding to coordinates such as, for example, latitude, longitude and/or altitude coordinates of real world objects. The geocoded information may be evaluated by the processor 70 and/or AR grouping module 78 and data associated with the geocoded information may be provided to a camera view of a display. In an example embodiment, the processor 70 and/or AR grouping module 78 may provide the information associated with the geocoded information to the camera view of the display, in response to determining that the location of the real world objects shown on the camera view of the display correspond to the location information of the geocoded information.

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, augmented reality (AR) browser, Web browser or the like. In this regard, the connectivity program may enable the apparatus 50 to transmit and receive Web content, such as for example location-based content or any other suitable content, according to a Wireless Application Protocol (WAP), for example. It should be pointed out that the AR browser may be a user interface that facilitates navigation of objects in a view of a physical real world environment with information such as, for example one or more points of interest that may provide data about surrounding real world objects. The points of interest may, but need not, be viewed as on top of the real world view. The AR browser may be utilized by the processor 70 to facilitate execution of one or more augmented reality applications. It should be pointed out that the processor 70 may also be in communication with a display 85 and may instruct the display to illustrate any suitable information, data, content (e.g., media content) or the like.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The apparatus 50 may include a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 may include all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50.

In addition, the apparatus 50 may include a positioning sensor 72. The positioning sensor 72 may include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information.

In an example embodiment, the apparatus 50 may further include (or be in communication with) an orientation module 71. The orientation module 71 may be any means such as a device or circuitry embodied in either hardware or a combination of hardware and software that is configured to determine the orientation of apparatus 50 and/or of the field of view of the camera module 36 of the apparatus 50.

Orientation module 71 may be configured to determine the orientation of apparatus 50 relative to a reference. In some cases, the reference may be a particular direction, such as North or another cardinal direction. However, other references may also be employed. As such, in one embodiment, the orientation module 71 may include a compass or other orientation sensor configured to determine the heading of the apparatus 50 or direction that the lens of the camera module 36 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module or simply an initial orientation.

In an example embodiment, the orientation of the field of view of the camera module 36 may be compared to the reference in order to determine the current orientation of the apparatus 50. Thus, for example, given an initial image, a particular feature may be selected as the reference. Thereafter, as the field of view is altered, the orientation module 71 may be configured to determine the orientation of the field of view of the camera module 36 based on the speed or amount of movement relative to the reference. While one embodiment may only determine orientation in a single plane (e.g., parallel to the surface of the earth), another embodiment may allow for orientation determination including an elevation aspect and/or axial aspect shifts. Thus, for example, the orientation module 71 may be configured to determine pitch and/or yaw of the apparatus 50 (e.g., pitch defining a degree of elevation and yaw defining an axial rotation). As such, for example, the orientation module 71 may include a device or other means for determining the orientation of the apparatus 50 (or the field of view of the camera module 36), which may be referred to as orientation information. In one embodiment, the orientation module 71 may include an electronic compass, a horizon sensor, gravity sensor, accelerometer, gyroscope, magnetometer and/or the like or any other sensor that may be useful in determining orientation information.

In an example embodiment, the processor 70 may be embodied as, include or otherwise control the AR grouping module. The AR grouping module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the AR grouping module 78 as described below. Thus, in an example in which software is employed, a device or circuitry (e.g., the processor 70 in one example) executing the software forms the structure associated with such means.

The AR grouping module 78 may retrieve (or request) virtual or augmented reality information (also referred to herein as AR information) that may be stored in an AR repository 84 that correlates to both the current location and the orientation information. The AR information may relate to one or more points of interest. The AR information may include, but is not limited to, geocoded information corresponding to location information (e.g., longitude, latitude and/or altitude coordinates) of real world objects (e.g., building, landmarks, etc.). In this regard, the points of interest may, but need not, relate to real world objects that are located substantially or approximately along a line (e.g., straight line). The real world objects may be associated with objects in a current location of the apparatus 50 shown in a camera view of the camera module 36 or display 85. The AR information may also include geocoded information that contains or is associated with data such as, text, audio, images, pictures, photographs, video data, or any other suitable data. The points of interest may be one or more virtual objects (e.g., icons, pictograms, images, or the like). The points of interest may also correspond to information, content, data or the like that may, but need not, be provided by one or more content providers. The AR repository 84 may be a portion of the memory device 76 or may be an external memory or database. Alternatively, the AR repository 84 may be collocated with the AR grouping module 78.

In one embodiment, the AR grouping module 78 may select AR information from the AR repository 84 after receipt of the location information and the orientation information. In one embodiment, some AR information may be pre-fetched based on location information, perhaps before orientation information is known or before specific AR information is requested. The pre-fetched AR information may be received from a remote source and stored locally so that computation resource consumption may be reduced when searching for specific AR information to match the current location and orientation information when it is time to retrieve AR information since a smaller set of AR information may need to be dealt with during the search operation.

In an example embodiment, the AR grouping module 78 may detect an instance in which the camera module 36 captures one or more real world objects and determines that at least some of the real world objects correspond to one or more points of interest. The points of interest may be associated with real world objects that are located substantially or approximately along a line (e.g., a straight line). In this regard, the AR grouping module 78 may group (also referred to herein as "view-group") the points of interest that correspond to the real world objects that may be located substantially or approximately along a line. As such, when the AR grouping module 78 determines that the points of interest correspond to real world objects located along the line, the AR grouping module 78 may include the points of interest in a group.

The group generated by the AR grouping module 78 may be associated with visible indicia that may be provided by the AR grouping module 78 to the display 85. In this manner, the visible indicia may be shown on the display 85. The visible indicia may, but need not, be a graphical element(s) such as an icon(s) or the like. In an example embodiment, the visible indicia may correspond to a graphical element such as for example a folder, tab, menu or the like. In response to the AR grouping module 78 detecting a selection of the visible indicia depicting the generated group of points of interest, the AR grouping module 78 may open the group and enable the points of interest included in the group to be viewed and accessed. For example, in an instance in which the AR grouping module 78 opens the group, the AR grouping module 78 may enable the points of interest to be displayed and selected by a user. In response to receipt of a selection of one or more points of interest, the AR grouping module 78 may enable provision of display of information associated with the selected point(s) of interest.

It should be pointed out that in an instance in which the AR grouping module 78 opens the group and enables provision of display of the points of interest, the points of interest may be visibly depicted in such a way that each point of interest is viewable and selectable even though the points of interest correspond to real world objects that are substantially or approximately located along a line. In this regard, the AR grouping module 78 is configured to enable display of points of interest corresponding to real world objects located along a line in such a manner that the points of interest are not hidden and do not block each other from being displayed.

Additionally, the AR grouping module 78 may close the opened group in response to receipt of a selection of the visible indicia (e.g., an icon depicting a folder or the like) at a time subsequent to an initial selection of the visible indicia. When the AR grouping module 78 closes the group, the points of interest included in the group may no longer be visible on a display for selection.

Referring now to FIG. 6, a diagram illustrating points of interest corresponding to real world objects that may be captured by the camera module at one or more view angles is provided. It should be pointed out that the orientation module 71 may determine the view angles of the camera module 36 in the manner described above. In the example embodiment of FIG. 6, the points of interest may be denoted by dots such as, for example, dot 18. The points of interest and their corresponding data may be retrieved by the AR grouping module 78 from the AR repository 84. The AR grouping module 78 may sort all detected points of interest corresponding to a direction from a location of an apparatus (e.g., apparatus 50) and the angle in which the camera module 36 is pointing to capture corresponding real world objects.

As an example, presume that the apparatus 50 is located at a position corresponding to the center of the circle 17. When a user of the apparatus 50 points the camera module 36 at real world objects in a line of direction at a view angle around 20°, for example, the AR grouping module 78 may determine that five points of interest corresponding to real world objects that are located substantially or approximately along a line (e.g., a virtual line around 20°) are detected. In this regard, the AR grouping module 78 may group these points of interest as depicted by the group 11. It should be pointed out that the AR grouping module 78 may consider points of interest to correspond to real world objects located along a line in instances in which the AR grouping module 78 determines that the real world objects are within a predetermined threshold (e.g., within ±5° of a line) of the corresponding line (e.g., a virtual line at 20°).

The AR grouping module 78 may group the points of interest together and enable the group to be displayed via display 85 as an item of visible indicia (e.g., a folder, tab, menu or the like). In an instance in which the AR grouping module 78 receives a selection of the item of visible indicia, the AR grouping module 78 may enable provision of display of the points of interest included in the group in such a manner that points of interest along a same line of direction that are farther away from the apparatus 50 are not blocked or hidden behind a point of interest associated with a real world object that is closest to the apparatus 50.

It should be pointed out that in one example embodiment, a user may adjust the view range of the camera module 36 to increase or decrease the number of points of interest that may be detected by the AR grouping module 78. For purposes of illustration and not of limitation, the user of the apparatus 50 may decrease the view range (e.g., 5 km) of the camera module 36 in an urban area (e.g., New York City) so that the number of points of interest provided by the AR grouping module 78 to the display 85 may be reduced. On the other hand, the user may increase the view range (e.g., 10 km) of the camera module 36 in a rural area, for example, so that the number of points of interest provided by the AR grouping module 78 to the display 85 may be increased. Additionally, in one example embodiment, a user may select a setting associated with the apparatus 50 that allows the AR grouping module 78 to detect points of interest based on one or more categories (e.g., gas stations, restaurants, etc.) in which the points of interest may be associated with real world objects located substantially or approximately along a line. In this embodiment, the AR grouping module may only detect points of interest within the selected category(ies) and other points of interest that are now within the selected category(ies) may not be grouped and may, instead, be disregarded for purposes of the grouping.

Referring now to FIG. 7, visible indicia generated by the AR grouping module 78 depicting a group of one or more points of interest corresponding to real world objects located substantially or approximately along a line is provided. As shown in FIG. 7, the AR grouping module 78 may generate visible indicia 19 such as, for example, a folder overlaid on a corresponding portion of an image 41 captured by the camera module 36. The corresponding portion of the image 41 may relate to the area in which the points of interest are approximately arranged along a virtual line corresponding to a line in which the real world objects are located. The visible indicia 19 may include information associated with the points of interest. As such, in an instance in which the user of the apparatus 50 selects the visible indicia 19 via a finger, pointing device or the like, the AR grouping module 78 may enable provision of display of the points of interest in the group (see e.g., FIG. 8). When the user of the apparatus 50 selects a portion of the visible indicia 19 (e.g., graphical representation of a folder) at a time subsequent to an initial selection of the visible indicia 19, the AR grouping module 78 may close the visible indicia 19 and the points of interest associated with the group may no longer be displayed.

Referring now to FIG. 8, a diagram illustrating an instance in which the AR grouping module 78 opened the visible indicia 19 and enabled provision of display of the points of interest associated with the group is provided. As shown in FIG. 8, the AR grouping module 78 may enable provision of display via display 85 of points included in the visible indicia 19 in response to receipt of a selection of the visible indicia by the user of the apparatus 50. In the example embodiment of FIG. 8, six points of interest 23, 27, 29, 31, 33, 35 are included in the visible indicia 19 and are shown via the display 85 overlaid on corresponding portions of an image 21 captured by the camera module 36. The AR grouping module 78 arranged the provision of display of the points of interest in a way that each of the points of interest may be displayed and accessible even though the points of interest correspond to real world objects that are substantially or approximately located along a line. In this regard, the points of interest of an example embodiment are not hidden or blocked and as such problems exhibited by the conventional approaches are alleviated.

As shown in the FIG. 8, the AR grouping module 78 may enable provision of display of the points of the interest of the group along with visual information indicating a name (e.g., museum 1 in New York City) corresponding to the points of interest 23, 27, 29, 31, 33, 35 and a distance (e.g., 5 kilometers) that each point of interest is away from the apparatus 50 as determined by the AR grouping module 78. When the group is opened by the AR grouping module 78, the points of interest may be selected by the user and in response to receipt of a selection the AR grouping module 78 may enable provision of display of content associated with a selected point(s) of interest. It should be pointed out that the AR grouping module 78 may close the opened group in response to receipt of a selection of visible content 37 (e.g., a graphical element of a star) depicting the opened group. Closing of the group by the AR grouping module 78 may cause the points of interest in the group to no longer be displayed.

In an example embodiment, the AR grouping module 78 may group the points of interest and enable provision of display of the group and the points of interest based on information stored locally in a memory (e.g., memory device 76) of the apparatus 50. In this regard, for example, the points of interest may, but need not, be preloaded in the memory device 76 of the apparatus 50. Additionally or alternatively, the points of interest may be received by the AR grouping module 78 from a network entity and the network entity may generate the group which may include the points of interest.

Referring now to FIG. 9, a diagram of a system in which a network device may communicate with an apparatus for receipt of information is provided. In the example embodiment of FIG. 9, the network device 108 may be a server (e.g., communication device 20) or the like. In response to the AR grouping module 78 receiving an indication that the camera module 36 captured one or more real world objects located substantially or approximately along a line, the AR grouping module 78 may provide the network device 108 with coordinates corresponding to the real world objects. In response to receipt of the coordinates, the network device 108 may determine that points of interest correspond to at least some of the coordinates of the real world objects captured by the camera module 36. As such, the network device 108 may generate a group that is associated with the points of interest and may send visible indicia depicting the group (e.g., a graphical element such as a folder, tab, menu, etc.) to the AR grouping module 78. In response to receipt of the group, the AR grouping module 78 may enable display of the group overlaid on a corresponding portion of an image or video being currently displayed by the apparatus 50 (e.g., mobile terminal 10). The corresponding portion may be associated with coordinates within a predetermined threshold of a line in which the real world objects are substantially or approximately located.

It should be pointed out that the group generated by the network device 108 which may be sent to the AR grouping module 78 may not initially include the data associated with the points of interest of the group. Instead, the network device 108 may send the visible indicia depicting the group to the AR grouping module 78 signifying that points of interest associated with the group are available even though the points of interest are not initially included in the group. In response to the AR grouping module 78 receiving an indication of a selection of the visible indicia depicting the group provided by the network device 108, the AR grouping module 78 may request the network device 108 to provide the corresponding points of interest. As such, the network device 108 may provide the points of interest corresponding to the generated group in response to receipt of the request from the AR grouping module 78. In this manner, the AR grouping module 78 may enable provision of display of the points of interest associated with the group generated by the network device 108.

In instances in which the network device 108 may send the visible indicia depicting the group to the AR grouping module 78, the network device 108 may conserve resources and minimize bandwidth since the data associated with the corresponding points of interest may not be initially included in the generated group. As described above, the network device 108 may send the data associated with the points of interest of the group, to the AR grouping module 78, in response to receipt of a request from the AR grouping module 78. The AR grouping module 78 may generate the request in response to receipt of a selection of the visible indicia (e.g., icon of a folder, tab, menu, etc.) depicting the group. In an example embodiment, the user of the apparatus 50 may select the visible indicia depicting the group by utilizing a finger, pointing device or the like to depress the visible indicia depicting the group. It should be pointed out that although one network device 108 is shown in FIG. 9, any suitable number of network devices may communicate with the apparatus 50 in like manner.

Referring now to FIG. 10, a block diagram of an example embodiment of a network entity, such as, for example, network device 108 of FIG. 9 is provided. As shown in FIG. 10, the network entity (e.g., a server) may include a processor 94 and a memory 96. The memory 96 may comprise volatile and/or non-volatile memory, and may store content, data and/or the like. The memory 96 may store client applications, instructions, and/or the like for the processor 94 to perform the various operations of the network entity. The memory 96 may be a tangible non-transitory device.

The processor 94 may also be connected to a communication interface 98 or other means for displaying, transmitting and/or receiving data, content, and/or the like. The user input interface 95 may comprise any of a number of devices allowing the network entity to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The network entity (e.g., network device 108) may receive data from the AR grouping module 78 relating to coordinates corresponding to real world objects substantially or approximately located along a line. In this regard, the processor 94 of the network entity may provide visible indicia depicting a generated group corresponding to points of interest associated with the coordinates. The group sent by the processor 94 of the network entity to the AR grouping module 78 may not initially include the data associated with the points of interest. In response to receipt of a request from the AR grouping module 78, the processor 94 of the network entity may send the AR grouping module 78 data (e.g., visible content) associated with the points of interest of the group. The data associated with the points of interest of the group may identify names of the respective points of interest and distances away from the apparatus 50. In response to receipt of the points of interest from the network entity, the AR grouping module 78 may enable provision of display of the points of interest via the display 85.

Referring now to FIG. 11, an example embodiment of a flowchart for grouping content in an augmented reality environment is provided. At operation 1100, an apparatus 50 may include means, such as the AR grouping module 78, the processor 70 and/or the like for receiving a detection of real world objects of a current location that are currently being displayed. The detection of real world objects may be based on receipt of data (e.g., an image(s), video(s), etc.) captured by the camera module 36 and provided to the AR grouping module 78 and/or the processor 70. At operation 1105, the apparatus 50 may include means, such as the AR grouping module 78, the processor 70 and/or the like for determining whether some of the real world objects are substantially or approximately located along the same line at various distances away from the apparatus. The real world objects that are substantially or approximately located along the same line may be based on the orientation (e.g., line of direction and view angle) of the camera module 36 capturing the real world objects.

At operation 1110, the apparatus 50 may include means such as the AR grouping module 78, the processor 70 and/or the like for determining whether points of interest correspond to the real world objects in response to determining that some of the real world objects are located substantially or approximately along the line. At operation 1115, the apparatus 50 may include means such as the AR grouping module 78, the processor 70 and/or the like for receiving an indication of a generated group of points of interest that are associated with the real world objects substantially located along the same line in a particular direction. The AR grouping module 78 may generate visible indicia denoting the group and enable display of the visible indicia denoting the group.

It should be pointed out that in one example embodiment, the visible indicia denoting the group may include data associated with the points of interest. In another example embodiment, the visible indicia denoting the group may not initially include data associated with the points of interest. However, in response to receipt of a selection, by the AR grouping module 78, of the visible indicia, data associated with the points of interest may be received from a device (e.g., network device 108) and included by the AR grouping module 78 in the group. At operation 1120, the apparatus 50 may include means such as the AR grouping module 78, the display 85, the processor 70 and/or the like for enabling opening or expansion of the group in response to receipt of a selection of the visible indicia denoting the group and enabling display of each of the points of interest of the group. For example, the AR grouping module 78 may enable provision of display of each of the points of interest in such a way that the points of interest corresponding to real world objects that are farther away from the apparatus 50 do not block or hide each other when displayed even though the corresponding real world objects are located at various distances substantially along the same line of direction.

At operation 1125, the apparatus 50 may include means such as the AR grouping module 78, the display 85, the processor 70 and/or the like for enabling provision of display of information associated with a point(s) of interest in response to receipt of a selection of the point(s) of interest. At operation 1130, the apparatus 50 may include means such as the AR grouping module 78, the processor 70 and/or the like for enabling closing of the group in response to receipt of another selection of the visible indicia denoting the group. Closing of the group by the AR grouping module 78 may cause the points of interest of the group to no longer be displayed.

It should be pointed out that FIG. 11 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96) and executed by a processor (e.g., processor 70, AR grouping module 78, processor 94). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 11 above may comprise a processor (e.g., the processor 70, AR grouping module 78, processor 94) configured to perform some or each of the operations (1100-1130) described above. The processor may, for example, be configured to perform the operations (1100-1130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1100-1130) may comprise, for example, the processor 70 (e.g., as means for performing any of the operations described above), the AR grouping module 78, the processor 94 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements That which is claimed:

1. A method comprising:
receiving a detection of real world objects, of a current location, that are currently being displayed;
determining whether one or more of the real world objects are located along a line of direction;
determining virtual objects that correspond to the real world objects that are located along the line of direction in response to determining that the real world objects are located within a predefined numerical tolerance threshold of the line of direction;
enabling, via a processor of an apparatus, provision of display of an item of visible indicia signifying a group, associated with the virtual objects, that is positioned so as to correspond to at least one of the real world objects located along the line of direction; and
enabling provision of display of the virtual objects in response to opening the group, each of the virtual objects are accessible and displayed without blocking, hiding or overlapping each other wherein the virtual objects correspond to respective real world objects located along the line of direction at respective distances from the apparatus.

2. The method of claim 1, wherein prior to enabling provision of display of the virtual objects the method further comprising:
determining that the virtual objects are included in the group; and
enabling opening of the group in response to receipt of a selection of the visible indicia.

3. The method of claim 2, further comprising:
enabling closing of the group in response to receipt of another selection of the item of visible indicia; and
determining that the virtual objects are no longer displayed in response to receipt of an indication that the group is closed.

4. The method of claim 1, further comprising:
determining that the detected real world objects are captured in at least one image or video at an orientation of the apparatus with respect to the current location, the orientation corresponds to a view angle and a direction.

5. The method of claim 1, further comprising:
determining that each of the virtual objects includes visual information identifying at least one of a name corresponding to a real world object along the line of direction or a distance from the apparatus to a respective real world object along the line of direction.

6. The method of claim 1, further comprising:
receiving the group from a device without the virtual objects being included in the group;
receiving the virtual objects from the device in response to receipt of a selection of the group; and
enabling inclusion of the received virtual objects in the group.

7. The method of claim 1, wherein enabling the provision of the display further comprises displaying each of the virtual objects in areas that are not located along the line of direction.

8. The method of claim 1, wherein:
the predefined numerical tolerance threshold comprises a predetermined numerical degree tolerance offset from the line of direction.

9. The method of claim 1, wherein:
the line of direction comprises a virtual line of direction.

10. An apparatus comprising:
at least one processor; and
at least one memory including computer program code configured to, with the at least one processor, cause the apparatus to perform at least the following:
receive a detection of real world objects, of a current location, that are currently being displayed;
determine whether one or more of the real world objects are located along a line of direction;
determine virtual objects that correspond to the real world objects that are located along the line of direction in response to determining that the real world objects are located within a predefined numerical tolerance threshold of the line of direction;
enable provision of display of an item of visible indicia signifying a group, associated with the virtual objects, that is positioned so as to correspond to at least one of the real world objects located along the line of direction; and
enable provision of display of the virtual objects in response to opening the group, each of the virtual objects are accessible and displayed without blocking, hiding or overlapping each other wherein the virtual objects correspond to respective real world objects located along the line of direction at respective distances from the apparatus.

11. The apparatus of claim 10, wherein prior to enable provision of display of the virtual objects the memory and computer program code are configured to, with the processor, cause the apparatus to:
determine that the virtual objects are included in the group; and
enable opening of the group in response to receipt of a selection of the visible indicia.

12. The apparatus of claim 11, wherein the memory and computer program code are configured to, with the processor, cause the apparatus to:
enable closing of the group in response to receipt of another selection of the item of visible indicia; and
determine that the virtual objects are no longer displayed in response to receipt of an indication that the group is closed.

13. The apparatus of claim 10, wherein the memory and computer program code are configured to, with the processor, cause the apparatus to:
determine that the detected real world objects are captured in at least one image or video at an orientation of the apparatus with respect to the current location, the orientation corresponds to a view angle and a direction.

14. The apparatus of claim 10, wherein the memory and computer program code are configured to, with the processor, cause the apparatus to:
determine that each of the virtual objects includes visual information identifying at least one of a name corresponding to a real world object along the line of direction or a distance from the apparatus to a respective real world object along the line of direction.

15. The apparatus of claim 10, wherein the memory and computer program code are configured to, with the processor, cause the apparatus to:
receive the group from a device without the virtual objects being included in the group;
receive the virtual objects from the device in response to receipt of a selection of the group; and enable inclusion of the received virtual objects in the group.

16. The apparatus of claim 10, wherein the memory and computer program code are configured to, with the processor, cause the apparatus to:
    enable the provision of the display by displaying each of the virtual objects in areas that are not located along the line of direction.

17. The apparatus of claim 10, wherein:
    the predefined numerical tolerance threshold comprises a predetermined numerical degree tolerance offset from the line of direction.

18. A computer program product comprising at least one non-transitory computer-readable storage medium having computer-readable program code portions stored therein, the computer-readable program code portions comprising:
    program code instructions configured to cause receipt of a detection of real world objects, of a current location, that are currently being displayed;
    program code instructions configured to determine whether one or more of the real world objects are located along a line of direction;
    program code instructions configured to determine virtual objects that correspond to the real world objects that are located along the line of direction in response to determining that the real world objects are located within a predefined numerical tolerance threshold of the line of direction;
    program code instructions configured to enable provision of display, via an apparatus, of an item of visible indicia signifying a group, associated with the virtual objects, that is positioned so as to correspond to at least one of the real world objects located along the line of direction; and
    program code instructions configured to enable provision of display of the virtual objects in response to opening the group, each of the virtual objects are accessible and displayed without blocking, hiding or overlapping each other wherein the virtual objects correspond to respective real world objects located along the line of direction at respective distances from the apparatus.

19. The computer program product of claim 18, wherein prior to enable provision of display of the virtual objects the computer program product further comprises:
    program code instructions configured to determine that the virtual objects are included in the group; and
    program code instructions configured to enable opening of the group in response to receipt of a selection of the visible indicia.

20. The computer program product of claim 19, further comprising:
    program code instructions configured to enable closing of the group in response to receipt of another selection of the item of visible indicia; and
    program code instructions configured to determine that the virtual objects are no longer displayed in response to receipt of an indication that the group is closed.

21. The computer program product of claim 18, further comprising:
    program code instructions configured to determine that the detected real world objects are captured in at least one image or video at an orientation of the apparatus with respect to the current location, the orientation corresponds to a view angle and a direction.

22. The computer program product of claim 18, further comprising:
    program code instructions configured to determine that each of the virtual objects includes visual information identifying at least one of a name corresponding to a real world object along the line or a distance from the apparatus to a respective real world object along the line of direction.

23. The computer program product of claim 18, further comprising:
    program code instructions configured to cause receipt of the group from a device without the virtual objects being included in the group;
    program code instructions configured to cause receipt of the virtual objects from the device in response to receipt of a selection of the group; and
    program code instructions configured to enable inclusion of the received virtual objects in the group.

24. The computer program product of claim 18, wherein enable the provision of the display further comprises displaying each of the virtual objects in areas that are not located along the line of direction.

25. The computer program product of claim 18, wherein:
    the predefined numerical tolerance threshold comprises a predetermined numerical degree tolerance offset from the line of direction.

* * * * *